Feb. 5, 1952  C. R. HUGHART  2,584,209
TWO-MAN PORTABLE POWER SAW
Filed March 28, 1947  3 Sheets-Sheet 1

Inventor
Charles R. Hughart
By Randolph & Beavers
Attorneys

Feb. 5, 1952 — C. R. HUGHART — 2,584,209
TWO-MAN PORTABLE POWER SAW
Filed March 28, 1947 — 3 Sheets-Sheet 2
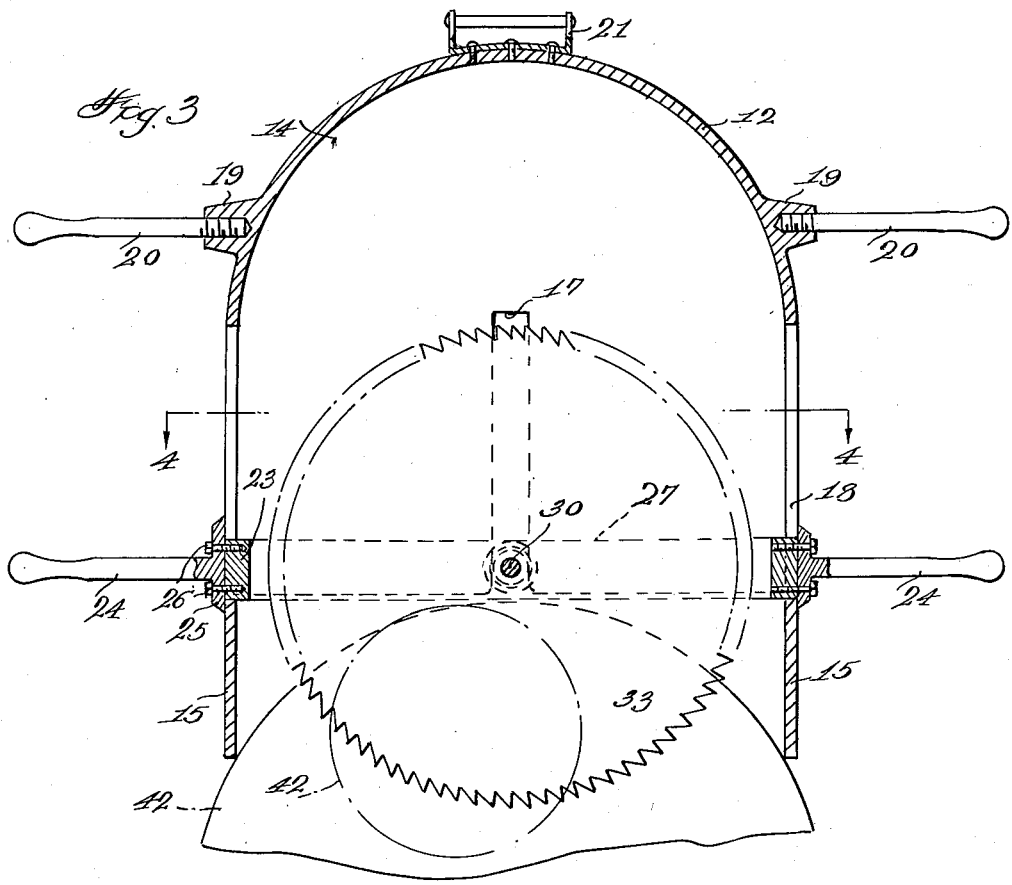
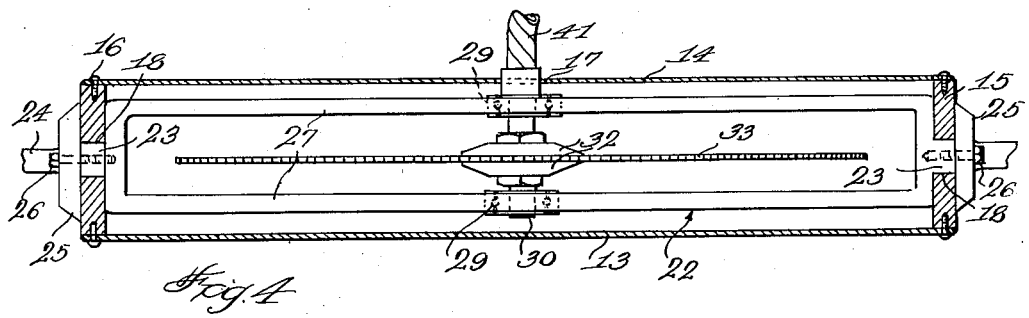
Inventor
Charles R Hughart
By Randolph & Beavers
Attorneys Feb. 5, 1952  C. R. HUGHART  2,584,209
TWO-MAN PORTABLE POWER SAW
Filed March 28, 1947  3 Sheets-Sheet 3
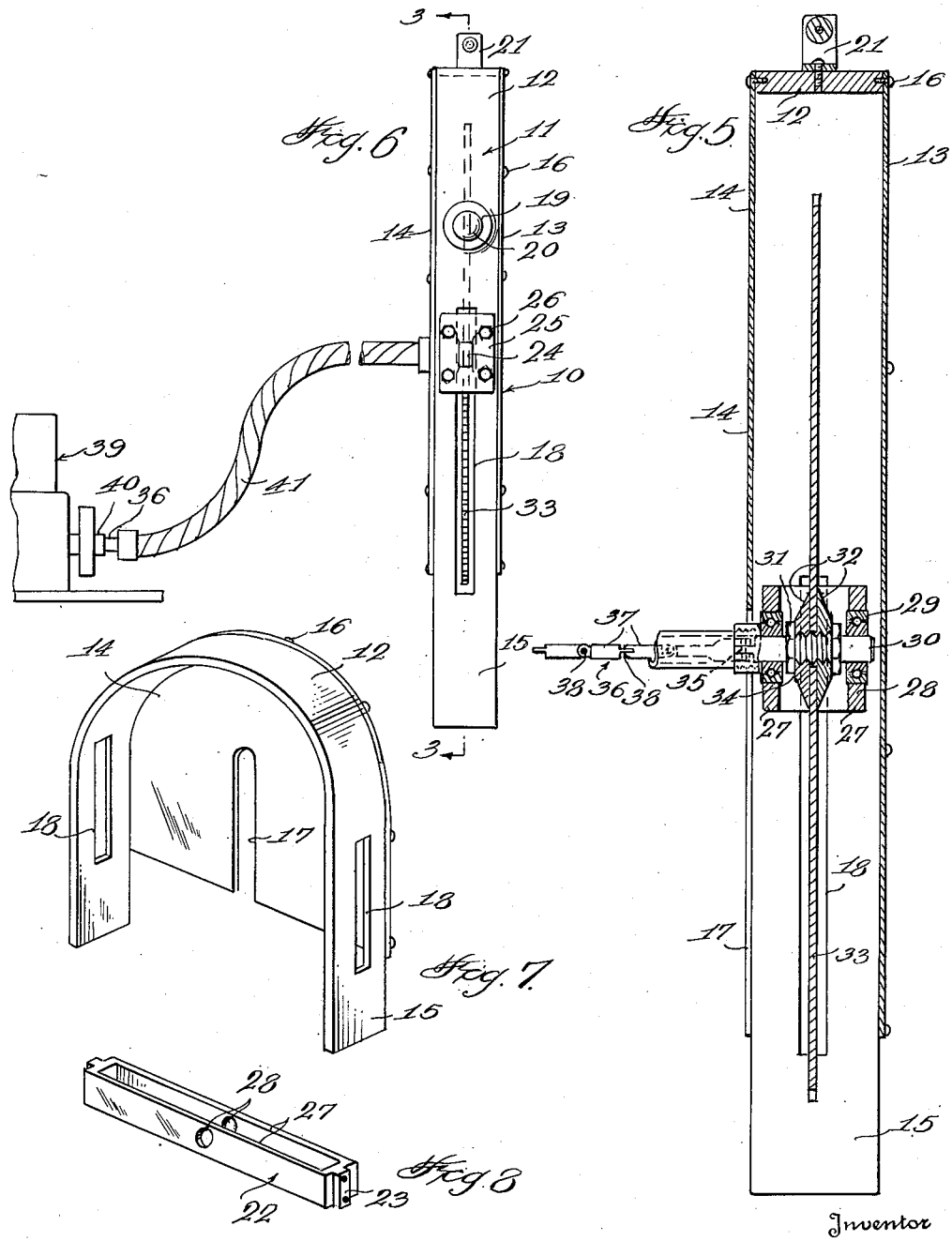
Inventor
Charles R. Hughart
By Randolph & Beavers
Attorneys Patented Feb. 5, 1952

2,584,209

UNITED STATES PATENT OFFICE 2,584,209

TWO-MAN PORTABLE POWER SAW

Charles R. Hughart, Fort Wayne, Ind.

Application March 28, 1947, Serial No. 737,751

4 Claims. (Cl. 143—43)

This invention relates to a novel construction of portable power saw for use in felling timber and more particularly to a manually supported power saw having means for guiding a driven saw blade thereof as it is advanced and fed toward the timber.

Still another object of the invention is to provide a portable power saw of extremely simple construction and which is capable of being driven by any suitable power source such as the power take-off shaft of a tractor and which may be utilized for efficiently and economically felling large trees.

Still a further object of the invention is to provide a power saw capable of being manually held at various angles with respect to the horizontal and vertical for felling trees efficiently and accurately in any desired direction and which may also be utilized for trimming branches from standing or felled timber and for cutting up felled timber.

Still another object of the invention is to provide a power saw of extremely simple construction, composed of a minimum of parts and which may be economically manufactured and sold and yet which will be durable and efficient for its intended purposes and capable of a wide variety of uses.

Various other objects and advantages of the invention will hereinafter become more fully apparent from the following description of the drawings, illustrating a preferred embodiment thereof, and wherein:

Figure 3 is a longitudinal, horizontal sectional view thereof, partly in elevation;

Figure 4 is a cross sectional view of the saw, taken substantially along a plane as indicated by the line 4—4 of Figure 3;

Figure 5 is a longitudinal sectional view taken substantially along a plane as indicated by the line 5—5 of Figure 2;

Figure 6 is an edge elevational view, on a reduced scale, of the saw and showing it connected to a power source;

Figure 7 is a perspective view of a portion of the guide frame, and

Figure 8 is a perspective view of the saw supporting slide.

Figure 1:
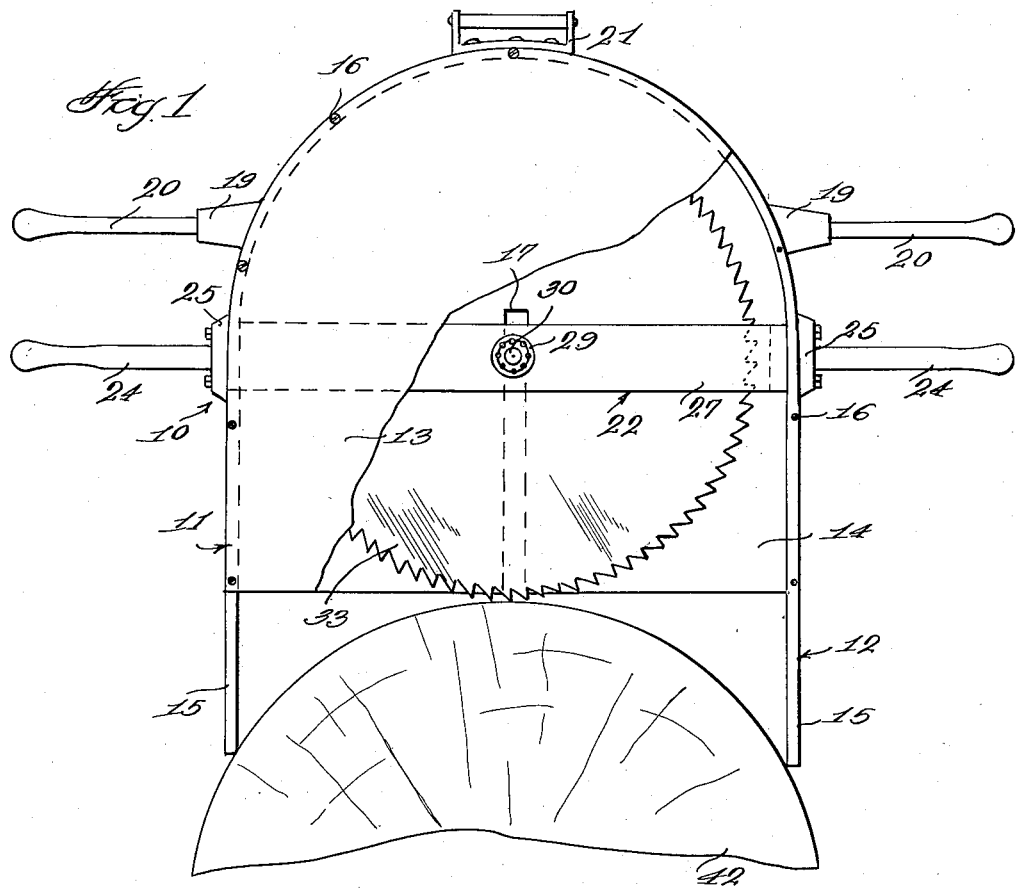
Figure 1 is a plan view, partly broken away, and illustrating the improved saw in an applied position.

Referring more specifically to the drawings, the improved power saw in its entirety and constituting the invention is designated generally 10 and includes a frame, designated generally 11 comprising a substantially U-shaped side portion 12, top and bottom plates 13 and 14, respectively. The plates 13 and 14 are provided with outer edges shaped to conform to the curvature of the side portion 12 and the edge portions of said plates are secured to the intermediate part of the side portion 12 and to portions of the legs 15 thereof by fastenings 16 for detachably mounting the plates 13 and 14. As clearly illustrated in Figure 1, the plates 13 and 14 are in spaced relationship to the free ends of the legs 15; and, as best seen in Figures 3 and 7, the plate 14 is provided with a longitudinal slot 17 which opens outwardly of the inner end of said plate. Also, as seen in Figures 3 and 7, the legs 15 are provided with complementary longitudinal slots 18 which extend from adjacent the bight portion of the side member 12 to approximately the inner ends of the plates 13 and 14.

As best seen in Figure 3, the side member 12 of the frame 11 is provided with outwardly projecting, transversely aligned internally threaded sockets 19 which are disposed adjacent the ends of the bight portion of the member 12 and each of which is adapted to receive the threaded shank end of a handle 20. A single handle 21 is secured to the outer side of the member 12, intermediate of the ends of the bight portion thereof and by means of which the saw 10 may be conveniently carried.

An elongated slide frame 22, as best seen in Figure 8, is disposed transversely between the legs 15 and is provided with a tongue 23 which projects from each end thereof and each of which tongues slidably engages one of the slots 18 for slidably mounting the slide frame 22 for movement longitudinally of the frame 11. A handle 24 is detachably connected to each of the tongues 23, said handles 24 each being provided with an enlarged transverse head 25 adapted to slidably engage the outer side of one of the legs 15 and provided with fastenings 26 extending therethrough and engaging in the adjacent tongue 23 for detachably securing the handle 24 thereto, and so that said handles 24 will combine to retain the slide frame 22 in slidable engagement with the legs 15. The slide frame 22 also includes spaced, substantially parallel longitudinal bars 27 having aligned openings 28 intermediate of their ends containing anti-friction bearings 29, as best seen in Figure 5, for journaling a shaft or axle 30 having an intermediate threaded portion 31 engaged by lock nuts 32. A circular saw blade 33 is provided with a central opening 34 loosely engaging the threaded portion 31 and the portion of the blade 33, surrounding said opening 34, is clamped between the lock nuts 32 for frictionally securing the blade 33 to the shaft or axle 30.

As seen in Figure 5, one end of the shaft or axle 30 extends into the slot 17 and is connected by a universal joint 35 to one end of a flexible shaft, designated generally 36, and formed of a plurality of short shaft sections 37 which are connected in end to end relationship by universal joints 38. The opposite end of the shaft 36 is connected to a suitable power source, designated generally 39, such as the power take-off shaft 40 of a tractor, not shown. The flexible shaft 36 is enclosed in a flexible tubular casing 41.

While the wall 14 has been described as the bottom wall, it will be readily apparent from the preceding description and from the drawings that the power saw 10 can be disposed as illustrated in Figure 1 and with the flexible shaft extending downwardly from the saw frame 11, or if the power source is located above the level of the saw frame, the latter can be inverted so that the wall 14 would then constitute the top wall thereof. Likewise, the portion of a tree trunk 42, illustrated in Figures 1 and 2, could be disposed in a horizontal position, rather than in a vertical position, as illustrated, as for example after being felled, and the saw 10 could then be disposed with the frame in an upright position for sawing the trunk 42 into sections.

Figure 2:
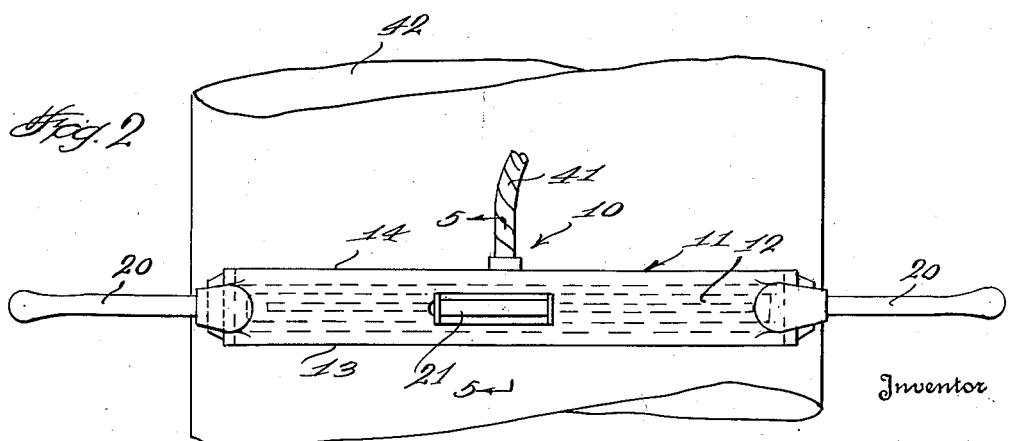
Figure 2 is an end elevational view thereof.

Assuming that the tree trunk 42 is disposed in an upright position, to cut through the tree trunk 42 with the saw 10 for felling the tree, said saw is disposed in substantially a horizontal plane as illustrated in Figures 1 and 2 and with the free ends of the legs 15 extending toward and partially encompassing the tree trunk. The saw frame 11 is supported manually by the handles 20 and with the saw blade 33 in its retracted position of Figure 1, and assuming that said blade is being driven from the drive shaft 40, the handles 24 are grasped for moving the slide frame 22 outwardly of the frame 11 and toward the tree trunk 42 for causing the blade 33 to cut into the tree trunk up to the extent of its forwardmost or advanced position of movement, as seen in Figure 3. The saw can then be moved approximately 90° in either direction around the tree trunk 42 and this operation repeated until the trunk has been cut through sufficiently to fell the tree. Obviously, for trees of smaller diameter, the trunk thereof could be cut through with a single cutting operation.

After the tree has been felled, as previously described, the saw frame 11 can be disposed in an upright position over the trunk and by the same procedure, the trunk may be cut into sections. In accomplishing this last operation, the saw may be operated in the same manner as previously described or may be held by the handle 21 which is normally used for carrying the saw, allowing the weight of the slide 22 and blade 33 to carry it downwardly into cutting engagement with the tree trunk. This last method of operation may be used most readily in cutting through timber of small diameters.

Likewise, the saw frame 11 may be disposed at any angle between the horizontal and vertical for felling small trees in any desired direction or for cutting up timber or trimming branches therefrom.

Various modifications and changes are contemplated and may obviously be resorted to, without departing from the spirit and scope of the invention as hereinafter defined by the appended claims.

I claim as my invention:

1. In a power saw of the character described, a supporting frame adapted to be manually supported and provided with an open end, an elongated loop-shaped slide mounted therein for free sliding movement toward and away from the open end of said frame, a circular saw blade journaled in said slide and carried thereby for movement relatively to the frame, and a flexible shaft connected to said saw blade and adapted to be connected to a driving shaft for revolving the blade relatively to the frame and blade supporting slide, said frame including spaced side members provided with longitudinal slots slidably engaged by end portions of said slide, and handle members detachably secured to said slide portions and projecting outwardly from the frame having inner ends engaging the outer surfaces of the side members of a width greater than the width of the slots for demountably attaching the slide to the frame and for providing means, adapted to be manually engaged, for moving the slide and saw blade longitudinally of the frame.

2. In a power saw of the character described, a supporting frame adapted to be manually supported and provided with an open end, an elongated loop-shaped slide mounted therein for free sliding movement toward and away from the open end of said frame, a circular saw blade journaled in said slide and carried thereby for movement relatively to the frame, and a flexible shaft connected to said saw blade and adapted to be connected to a driving shaft for revolving the blade relatively to the frame and blade supporting slide, said frame including spaced side members provided with longitudinal slots slidably engaged by end portions of said slide, handle members detachably secured to said slide portions and projecting outwardly from the frame having inner ends engaging the outer surfaces of the side members of a width greater than the width of the slots for demountably attaching the slide to the frame and for providing means, adapted to be manually engaged, for moving the slide and saw blade longitudinally of the frame, and rigid handle members projecting outwardly from said frame adjacent the first mentioned handle members and adapted to be manually engaged for supporting the frame in an operative position.

3. In a power saw of the character described, a supporting frame adapted to be manually supported and provided with an open end, an elongated loop-shaped slide mounted therein for free sliding movement toward and away from the open end of said frame, a circular saw blade journaled in said slide and carried thereby for movement relatively to the frame, and a flexible shaft connected to said saw blade and adapted to be connected to a driving shaft for revolving the blade relatively to the frame and blade supporting slide, said frame comprising a substantially U-shaped side member having longitudinally disposed slots in the legs thereof slidably engaged by said slide, and top and bottom portions secured to the edges of said U-shaped side member and combining therewith to form a housing for the slide and blade having an open end through which a portion of the blade is movable, and said legs projecting beyond the open end of the frame for engagement with the work.

4. In a power saw of the character described, a supporting frame adapted to be manually supported and provided with an open end, an elongated loop-shaped slide mounted therein for free sliding movement toward and away from the open end of said frame, a circular saw blade journaled in said slide and carried thereby for movement relatively to the frame, and a flexible shaft connected to said saw blade and adapted to be connected to a driving shaft for revolving the blade relatively to the frame and blade supporting slide, said frame including spaced side members provided with longitudinal slots slidably engaged by end portions of said slide, and handle members detachably secured to said end portions of the slide and projecting outwardly from said sides of the frame having inner ends engaging the outer surfaces of the side members of a width greater than the width of the slots for demountably attaching the slide to the frame and providing means, adapted to be manually engaged for moving the slide and saw blade longitudinally of the frame, said handle members being disposed in horizontal alignment when said frame is disposed with its plane in either a horizontal position or in an upright or vertical position.

CHARLES R. HUGHART.

REFERENCES CITED

The following references are of record in the file of this patent:

UNITED STATES PATENTS

| Number | Name | Date |
|---|---|---|
| 158,325 | Starr | Dec. 29, 1874 |
| 711,207 | Grogan | Oct. 14, 1902 |
| 906,724 | Koester | Dec. 15, 1908 |
| 1,152,976 | Rioux | Sept. 7, 1915 |
| 1,297,034 | Strand | Mar. 11, 1919 |
| 1,304,859 | Dobbins | May 27, 1919 |
| 1,847,919 | Blessing | Mar. 1, 1932 |
| 2,378,554 | Irwin | June 19, 1945 |

FOREIGN PATENTS

| Number | Country | Date |
|---|---|---|
| 401,505 | Germany | Sept. 4, 1924 |